US009489158B1

(12) United States Patent
Jamieson et al.

(10) Patent No.: US 9,489,158 B1
(45) Date of Patent: Nov. 8, 2016

(54) PRINT LOGGING FOR USE WITH TERMINAL EMULATORS

(71) Applicants: Robert J Jamieson, Kuala Lumpur (MY); Grant R Paine, Dunedin (NZ)

(72) Inventors: Robert J Jamieson, Kuala Lumpur (MY); Grant R Paine, Dunedin (NZ)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 14/823,332

(22) Filed: Aug. 11, 2015

(51) Int. Cl.
*G06F 3/12* (2006.01)

(52) U.S. Cl.
CPC .......... *G06F 3/1222* (2013.01); *G06F 3/1238* (2013.01); *G06F 3/1273* (2013.01); *G06F 3/1297* (2013.01)

(58) Field of Classification Search
USPC ..................... 358/1.14, 1.13, 1.15
See application file for complete search history.

(56) References Cited

U.S. PATENT DOCUMENTS

| | | | | |
|---|---|---|---|---|
| 2003/0030835 A1* | 2/2003 | Yoshida | ............. | G06K 15/00 358/1.14 |
| 2003/0120954 A1* | 6/2003 | Sugiyama | ............. | G06F 21/608 726/4 |
| 2007/0124800 A1* | 5/2007 | Kadota | ............. | H04L 63/08 726/2 |
| 2011/0181904 A1* | 7/2011 | Shimasaki | ............. | G03G 21/02 358/1.14 |
| 2012/0105887 A1* | 5/2012 | Osaki | ............. | G06F 3/1219 358/1.13 |
| 2012/0105900 A1* | 5/2012 | Tsuzuki | ............. | G06K 15/4095 358/1.14 |
| 2014/0071476 A1* | 3/2014 | Aritomi | ............. | G06F 3/1222 358/1.14 |
| 2014/0320899 A1* | 10/2014 | Willett | ............. | G06F 3/1224 358/1.15 |
| 2015/0370847 A1* | 12/2015 | Kondoh | ............. | G06F 17/30876 707/691 |
| 2016/0004492 A1* | 1/2016 | Lin | ............. | G06F 3/1238 358/1.13 |

* cited by examiner

*Primary Examiner* — Jerome Grant, II
(74) *Attorney, Agent, or Firm* — Robert P. Marley; Richard J. Gregson

(57) ABSTRACT

Print control and print logging may be performed using a web service and a terminal emulator. This may enable a business using an enterprise business application to monitor, control, and log printing activity for further analysis. This functionality may be useful to provide additional security and privacy for business activities. The web service may receive print data and store the print data in a staging database record. The staging record may be analyzed and the data stored as a profile record. The profile record may contain user profile information along with respective access paths for a received print request. The staging record may be deleted upon creation of the profile record. The profile record may be searched and analyzed for particular print information and data reports may be provided and output to an enterprise application.

15 Claims, 5 Drawing Sheets

300

302　304　306　308

| Attribute | Size | Direction | Description |
|---|---|---|---|
| ComputerName | 20 Characters | Input | PC name |
| IPAddress | 20 Characters | Input | PC IP Address |
| PrinterName | 30 Characters | Input | Printer name |
| ScreenBuffer | 1,920 Characters | Input | WebEnabler screen buffer without control characters |
| Station | 20 Characters | Input | MCP station name |
| UserName | 20 Characters | Input | Domain user name |
| StatusLine | 80 Characters | Input | Status line |
| LogStatus | 5 Characters | Output | Values<br>• "OK"<br>• "DENY"<br>• "FAIL" |
| LogMessage | 100 Characters | Output | Status message to be displayed/logged by WebEnabler |
| StatusMessages | | Output | Standard AB Suite status line or error messages |

FIG. 3

PRINT LOGGING FOR USE WITH TERMINAL EMULATORS

The instant disclosure relates to controlling and logging print activity using a terminal emulator. More specifically, this disclosure relates to restricting print activity to certain authorized users and creating a log of all print activity for future analysis.

BACKGROUND

Many large business organizations may use enterprise applications to manage their day-to-day operations. In today's corporate environment, enterprise applications may be complex, scalable, distributed, component-based, and mission-critical. They may be deployed on a variety of platforms across corporate networks, intranets, or the Internet. They are data-centric, user-friendly, and must meet stringent requirements for security, administration, and maintenance.

A terminal emulator, such as Unisys Web Enabler, is a set of run-time components that may permit workstation access to a host system over the network so that customers can have easy access to business applications. The host system could be a mainframe or similar centralized server and the business application developed in 3GL languages or a 4GL tool like Unisys' Agile Business Suite. A terminal emulator may be used as an interface tool to present a character-based screen of information (based on 24 rows and 80 columns of data) from the business application on the end-user's workstation. Using a terminal emulator, one can quickly put a user interface onto end-user's real-time transactions on the Web and offer potential customers an easy point of entry into business operations.

However, this may present some security and privacy issues that may need to be resolved. One desired functionality of an enterprise application may be to implement security controls tailored to a particular client and log all print activity for future analysis. Other controls, like a restriction on copy/paste functionality to authorized users may also be implemented. There may be a desire for use of such functionalities with a terminal emulator.

SUMMARY

According to one embodiment, a method includes determining a proper user access for one or more print requests; creating a print log data; analyzing the print log data; and developing one or more data reports based on the print log data in response to an inquiry request. The method of creating the print log data includes creating a data buffer based on a received input; reading the data buffer; creating a staging record based on information contain in the data buffer; setting one or more status codes to appropriate values; sending an access message to a user based on the proper user access; and initializing a processing routine.

The method of analyzing the print log includes reading the staging record; searching for authentication information; creating a record with indices; storing the record with indices; and deleting the staging record. The method further includes where the staging record comprises a plurality of attributes, attribute sizes, attribute directions, and attribute descriptions. The method further includes where the one or more status codes denote an access result of the one or more print requests. The method further includes the access result comprising one or more of print request approval, print request denial, and print logging failure.

According to another embodiment, a computer program product includes a non-transitory computer readable medium having code to determine a proper user access for one or more print requests; code to create a print log data; code to analyze the print log data; and code to develop one or more data reports based on the print log data in response to an inquiry request. The medium also includes code to create a data buffer based on a received input; code to read the data buffer; code to create a staging record based on information contain in the data buffer; code to set one or more status codes to appropriate values; code to send an access message to a user based on the proper user access; and code to initialize a processing routine. The medium also includes code to read the staging record; code to search for authentication information; code to create a profile record; code to store the profile record; and code to delete the staging record.

According to a further embodiment, an apparatus includes a memory for storing a database and includes a processor coupled to the memory. The processor is configured to determine a proper user access for one or more print requests; to create a print log data; to analyze the print log data; and to develop one or more data reports based on the print log data in response to an inquiry request. The processor is further configured to create a data buffer based on a received input; to read the data buffer; to create a staging record based on information contain in the data buffer; to set one or more status codes to appropriate values; to send an access message to a user based on the proper user access; and to initialize a processing routine. The processor is further configured to read the staging record; to search for authentication information; to create a profile record; to store the profile record; and to delete the staging record.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

FIG. 3 is an exemplary list of attributes contained in a staging record according to one embodiment of the disclosure.

DETAILED DESCRIPTION

Print control and logging may be implemented as a web service product that a terminal emulator can consume. A logged data buffer may then be processed by a report to analyse the content and create other database structures to be used for inquiry and reporting purposes.

Figure 1:
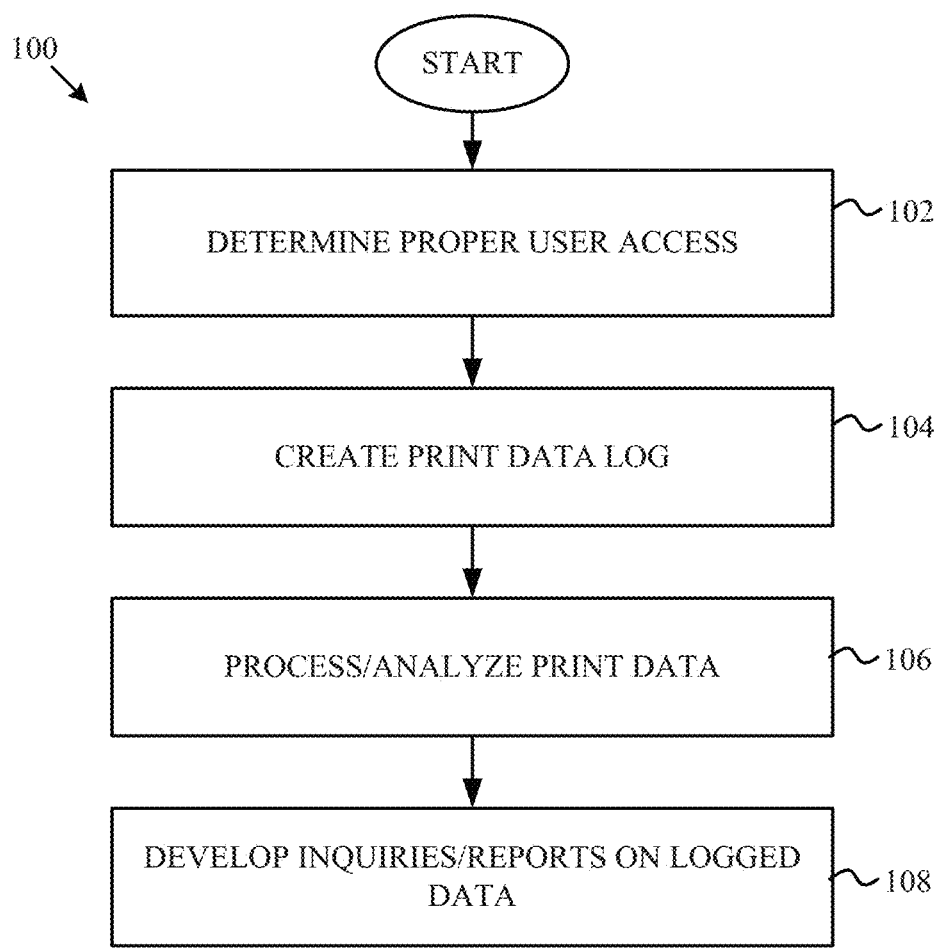
FIG. 1 is a flow chart illustrating an exemplary method for logging print activity in terminal emulators.

FIG. 1 is flow chart illustrating an exemplary method for logging print activity in terminal emulators using a web service product. A method 100 begins at block 102 with determining a proper user access. Different levels of user access may be configured into the terminal emulator to allow different users certain print privileges.

In some embodiments, the web service may limit the use of a print function to authorized users. This may be controlled by a registry setting or an encrypted key in an INI file on the end-user workstation. Print authorization levels may be set by an administrator and an end-user may not be able to enable or disable their print setting. In some embodiments, multiple users can access a workstation and each user may have a customized web profile (e.g. short-cut keys). In these cases, the control of printing may be per user. In some embodiments, the web service may limit printing to a default printer configured in a group of pre-stored printers and not provide a user with options to select a printer. The default printer may be defined by an administrator when installing or configuring the web service.

At block 104, the web service may create a print log data from collected print data. At block 106, the print logging application may process and analyze the print log data. These processes will be discussed in further detail below. At block 108, the print logging application may process inquiries on the print log data and may issues reports.

Certain database structures ("Ispecs") may be created that may allow users to search the logged print data. For example, there may be an inquiry transaction to search by certain identification parameters, such as a usercode or a card number. Other inquiries may use workstation identifiers as search criteria. Web browser applications and batch programs may be developed based on the created inquiry ispecs.

In some instances, there may be a need to create report output from various queries. Ispecs may be developed to accept report parameters and initiate an output report. The output report may create a data file suitable to be used with an enterprise output management tool. The enterprise output management tool may be used to format the output report and distribute the report as needed. For example, the enterprise output management tool may create a formatted report using a forms overlay. It may then convert the report to PDF format with attributes to limit who may read the file. It may also email the report to a particular group of users.

Figure 2:
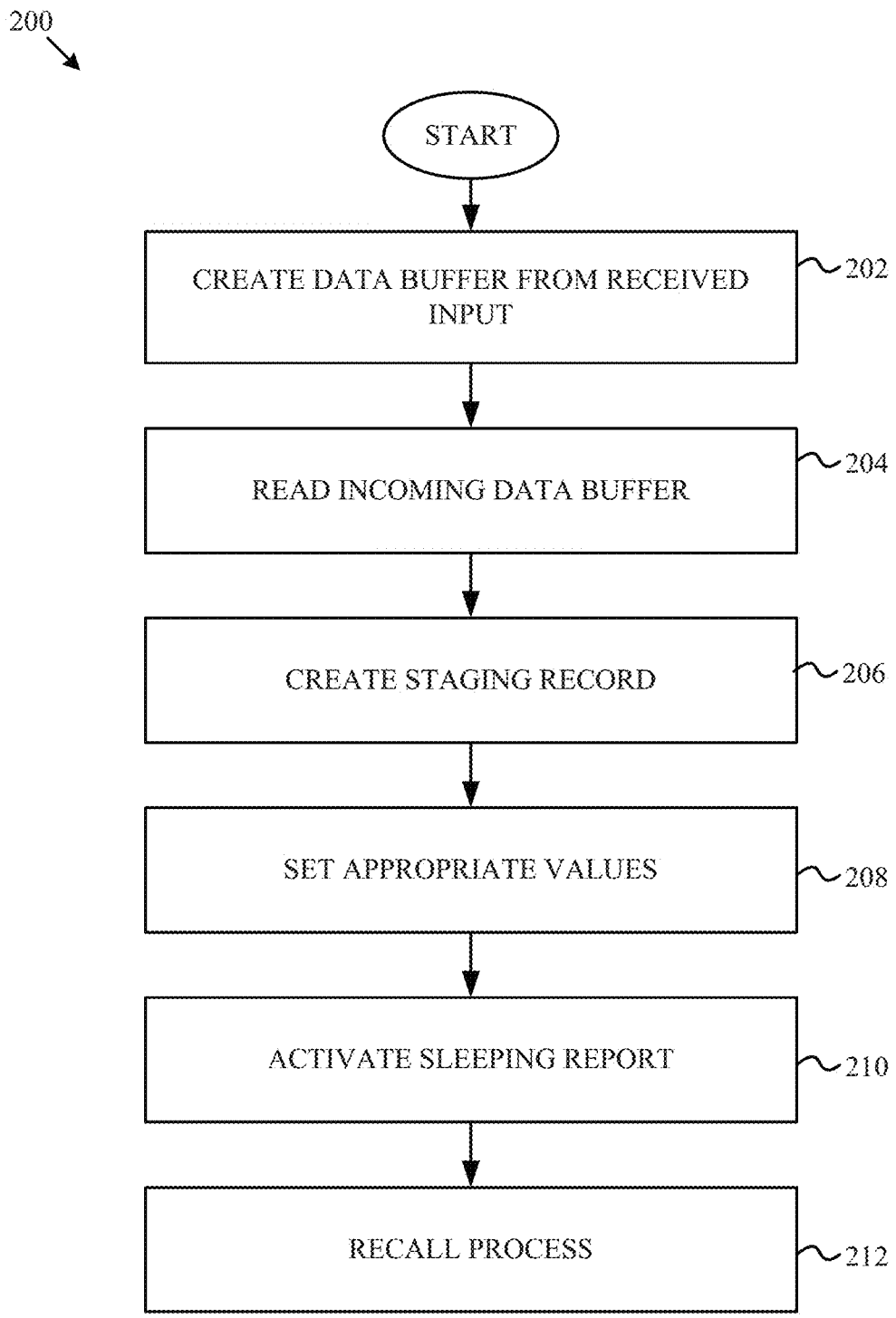
FIG. 2 is a flow chart illustrating an exemplary method for creating a print log according to one embodiment of the disclosure.

FIG. 2 is a flow chart illustrating an exemplary method 200 for creating a print log according to one embodiment of the disclosure. At block 202, the web service may receive a user input and create a data buffer. The user input may be a print request and a respective result of that print request. For example, a user may input a print request and may be granted or denied based on an authorization level. At block 204, the print logging application exposing the web service may read the data buffer. In some embodiments, the print logging application exposing the web service may not perform data validation or analysis so end-user response time is not adversely affected by the logging process. At block 206, the print logging application exposing the web service may create a staging record. The staging record may be a persistent database record (e.g. an "ispec" in AB Suite terminology) based on the data in the data buffer. The ispec may use a system date and time as a key. The print logging application exposing the web service may also create duplicates of the staging ispec. At block 208, the print logging application exposing the web service may set status values in the staging ispec. The status values may represent a print log status. The status values may also include messages for notifying a user of a print request status.

In some embodiments, the status values may be OK, FAIL, or DENY. An OK value may be used to indicate that print request details have been successfully logged. In this case, the OK sent to the terminal emulator via the web service and the terminal emulator may print the request. A FAIL value may be used to indicate that a print request could not be logged by the print logging application exposing the web service. In this case, some sort of error message may be sent to the terminal emulator. In some embodiments, the error message may be displayed to a user via a pop-up dialog. In some embodiments, the web service may have a setting to indicate whether the print should continue. The terminal emulator may prevent the print or allow the print based on configuration settings. A DENY value may be used to indicate that a print request has been denied by the print logging application exposing the web service. This may be due to the user requesting the print request lacking necessary authorization credentials. In this case, a message may be sent that contains the reason for the denial. In some embodiments, the message may be displayed to a user via a pop-up dialog. In this case, the print request may not be performed.

At block 210, the print logging application may activate a sleeping report. A sleeping report may be developed to contain requirements for processing the staging record. At block 212, the print logging application may recall the process to be ready to receive another user input. This embodiment is to allow processing of staging records to be performed as a background task and not impact the end-user response time to their print request.

FIG. 3 is an exemplary list of attributes 300 contained in a staging record according to one embodiment of the disclosure. Field 302 may contain a list of attribute names. Field 304 may contain a list of attribute sizes. Field 306 may contain a list of attribute directions. Field 308 may contain a list of attribute descriptions. The staging record may contain one of more attributes representing: date, time, PC Name, user account and/or domain name, printer name, workstation name, screen buffer, log status, and status message.

In some embodiments, the screen buffer field may contain the data to be logged. In some embodiments, the screen buffer field may contain 1920 characters that represent 24 lines of 80 characters. The 80 characters may not contain control characters. For example, fields that require highlighting may only be represented by the field contents without any highlighting. However, password fields may still be passed as a field of asterisks ('*'). In some embodiments, the log status may contain a status value of OK, FAIL, or DENY. The status message may be based on the log status value.

Figure 4:
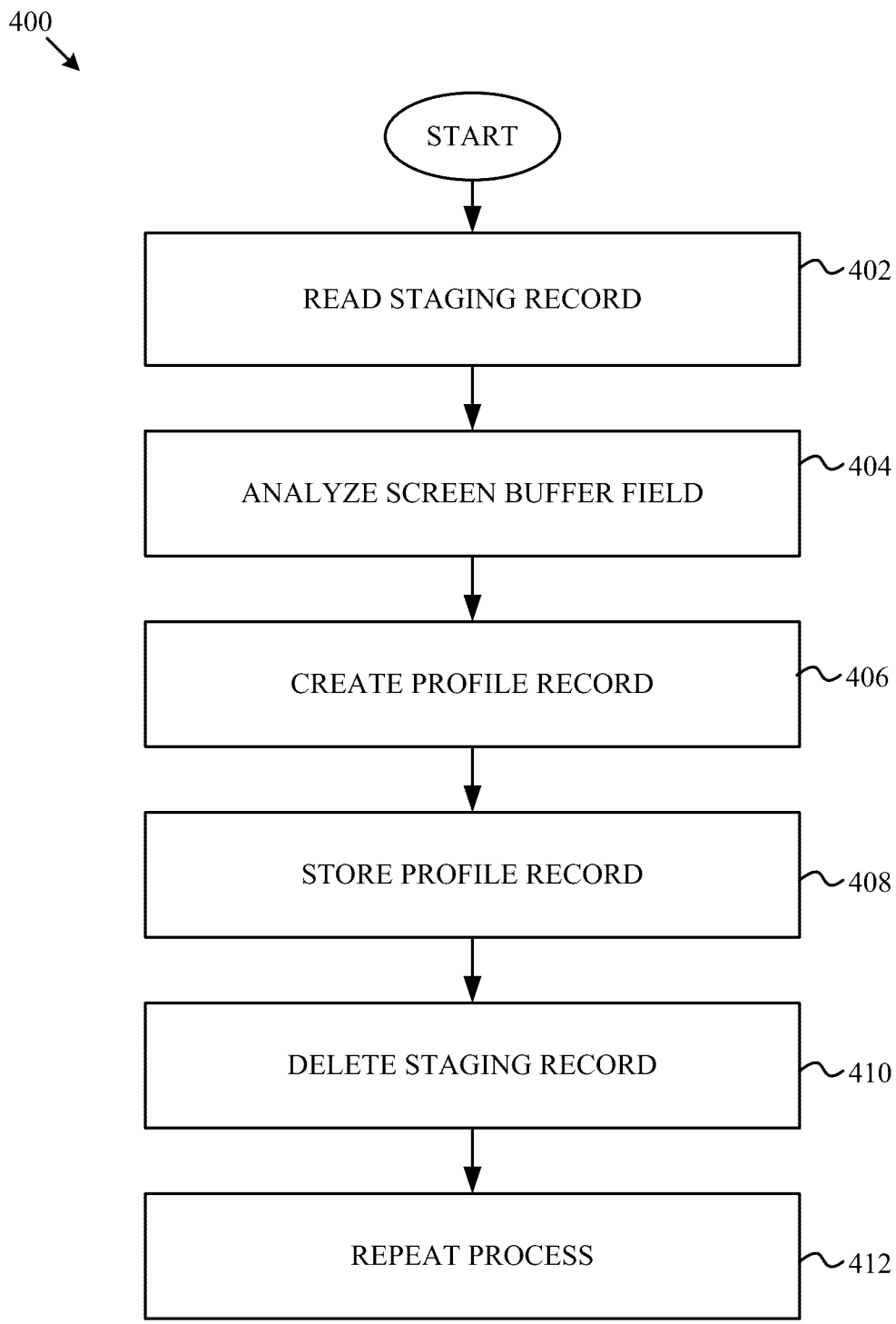
FIG. 4 is a flow chart illustrating an exemplary method for processing print log data according to one embodiment of the disclosure.

FIG. 4 is a flow chart illustrating an exemplary method 400 for processing print log data according to one embodiment of the disclosure. At block 402, the print logging application may read the staging record. At block 404, the print logging application may analyze the staging record. In some embodiments, a sleeping report may read and analyze the staging record. For example, the sleeping report may analyze the screen buffer field in accordance with enterprise application business rules to look for user identifiers such as usercodes and card numbers.

At block 406, the print logging application may create a record with indices (referred to as a profile record) for ease of inquiry. The profile record may be a data structure or ipsec containing attributes representing print log data, user profile information, and any applicable access paths. The attributes of the new ispec may be used as ordinates or keys to various user profiles so inquiry requests and reporting may be accomplished. At block 408, the data buffer may store the profile record as part of a print log database. At block 410, the print logging application may delete the staging record to free up space and prevent unnecessary duplicate records. At block 412, the print logging application may repeat the process to read and analyze another staging record. Additionally, at this point, users may send inquiry requests and receive data reports as discussed above at block 108. The inquiry requests may be handled through a web browser application. The reporting functionality may include sending a data file to the enterprise output management tool for processing.

Figure 5:
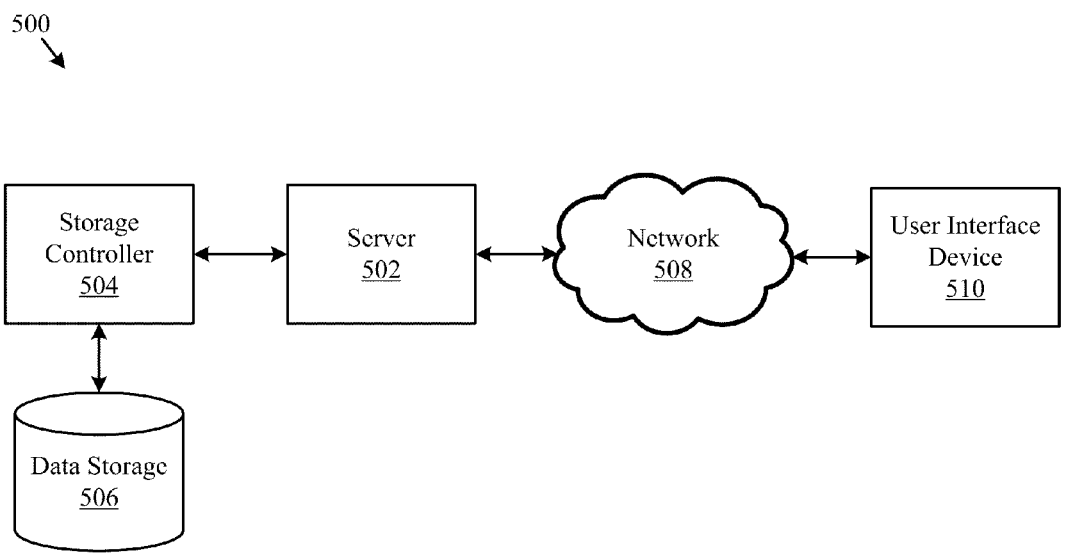
FIG. 5 is block diagram illustrating a computer network according to one embodiment of the disclosure.

FIG. 5 illustrates one embodiment of a system 500 for an information system, such as a web system for logging print data. The system 500 may include a server 502, a data storage device 506, a network 508, and a user interface device 510. The server 502 may be a dedicated server or one server in a cloud computing system. In a further embodiment, the system 500 may include a storage controller 504, or storage server configured to manage data communications between the data storage device 506 and the server 502 or other components in communication with the network 508. In an alternative embodiment, the storage controller 504 may be coupled to the network 508.

In one embodiment, the user interface device 510 is referred to broadly and is intended to encompass a suitable processor-based device such as a desktop computer, a laptop computer, a personal digital assistant (PDA) or tablet computer, a smartphone or other a mobile communication device having access to the network 508. The device 510 has installed a terminal emulator that connects via the network to the server 502.

The network 508 may facilitate communications of data, such as authentication information, between the server 502 and the user interface device 510. The network 508 may include any type of communications network including, but not limited to, a local area network (LAN), a wide area network (WAN), a modem-to-modem connection, the Internet, a combination of the above, or any other communications network now known or later developed within the networking arts which permits two or more computers to communicate.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
    determining a user access for one or more print requests;
    creating a print log data;
    analyzing the print log data;
    developing one or more data reports based on the print log data in response to an inquiry request;
    creating a data buffer based on a received input;
    reading the data buffer;
    creating a staging record based on information contain in the data buffer, wherein the staging record includes a computer name, a computer IP address, a printer name, and a log status, the log status includes a value, the value indicates one selected from the following: print request details have been successfully logged and print request details cannot be logged;
    sending an access message to a user based on the user access; and
    initializing a processing routine.

2. The method of claim 1, where analyzing the print log comprises:
    reading the staging record;
    searching for authentication information;
    creating a profile record;
    storing the profile record; and
    deleting the staging record.

3. The method of claim 1, where the staging record comprises a plurality of attributes, attribute sizes, attribute directions, and attribute descriptions.

4. The method of claim 1, where the log status denotes an access result of the one or more print requests.

5. The method of claim 4, the access result comprising one or more of print request approval, print request denial, and print logging failure.

6. A computer program product, comprising:
    a non-transitory computer readable medium including codes, wherein the codes when executed cause a processor to perform the steps:
    determining user access for one or more print requests;
    creating a print log data;
    analyzing the print log data;
    developing one or more data reports based on the print log data in response to an inquiry request;
    creating a data buffer based on a received input;
    reading the data buffer;
    creating a staging record based on information contain in the data buffer, wherein the staging record includes a computer name, a computer IP address, a printer name, and a log status, the log status includes a value, the value indicates one selected from the following: print request details have been successfully logged and print request details cannot be logged;
    sending an access message to a user based on the proper user access; and
    initializing a processing routine.

7. The computer program product of claim 6, the steps further including:
   reading the staging record;
   searching for authentication information;
   creating a profile record;
   storing the profile record; and
   deleting the staging record.

8. The computer program product of claim 6, where the staging record comprises a plurality of attributes, attribute sizes, attribute directions, and attribute descriptions.

9. The computer program product of claim 6, where the log status denotes an access result of the one or more print requests.

10. The computer program product of claim 9, the access result comprising one or more of print request approval, print request denial, and print logging failure.

11. An apparatus, comprising:
   a memory for storing a database; and
   a processor coupled to the memory, in which the processor is configured:
      to determine a proper user access for one or more print requests;
      to create a print log data;
      to analyze the print log data;
      to develop one or more data reports based on the print log data in response to an inquiry request;
      to create a data buffer based on a received input;
      to read the data buffer;
      to create a staging record based on information contain in the data buffer, wherein the staging record includes a computer name, a computer IP address, a printer name, and a log status, the log status includes a value, the value indicates one selected from the following: print request details have been successfully logged and print request details cannot be logged;
      to send an access message to a user based on the proper user access; and
      to initialize a processing routine.

12. The apparatus of claim 11, in which the processor is configured, when analyzing the print log:
   to read the staging record;
   to search for authentication information;
   to create a profile record;
   to store the profile record; and
   to delete the staging record.

13. The apparatus of claim 11, where the staging record comprises a plurality of attributes, attribute sizes, attribute directions, and attribute descriptions.

14. The method of claim 11, where the log status denotes an access result of the one or more print requests.

15. The method of claim 14, the access result comprising one or more of print request approval, print request denial, and print logging failure.

* * * * *